UNITED STATES PATENT OFFICE.

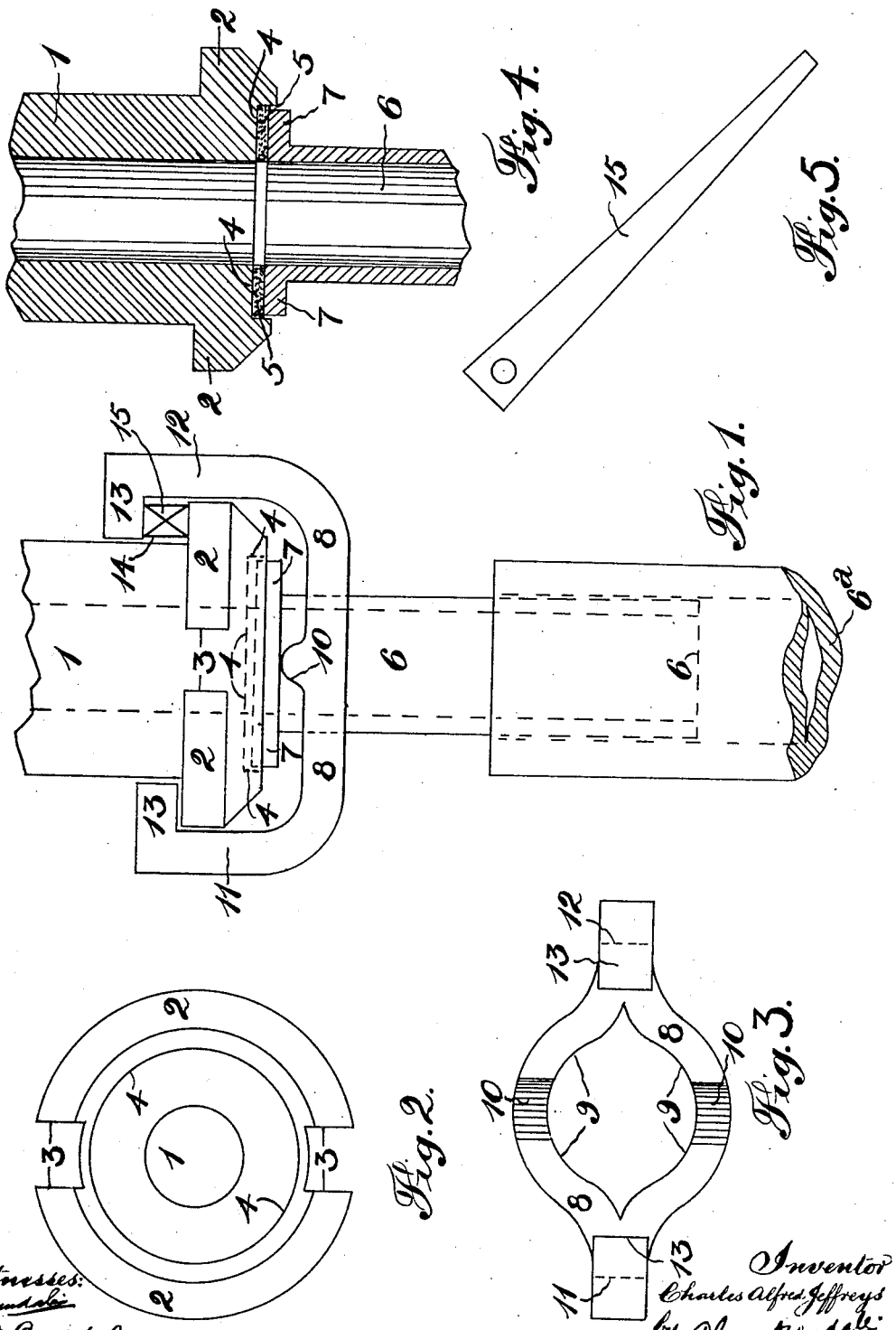

CHARLES ALFRED JEFFREYS, OF EAST RAND, TRANSVAAL.

HOSE-PIPE COUPLING.

No. 892,524.　　　　　Specification of Letters Patent.　　　　Patented July 7, 1908.

Application filed September 30, 1907. Serial No. 395,172.

*To all whom it may concern:*

Be it known that I, CHARLES ALFRED JEFFREYS, a subject of the King of Great Britain, and resident of East Rand, Transvaal, have invented certain new and useful Improvements in Hose-Pipe Couplings, of which the following is a specification.

This invention relates to pipe couplings, and has been primarily designed for making the connection between the tail piece or tubular part which is clamped or otherwise attached to the hosepipe conveying compressed air or other actuating fluid to a rock-drilling machine and the spud or other equivalent tubular member formed upon or attached to the rock-drilling machine.

The invention will now be described in detail by aid of the accompanying drawing, in which by way of example I illustrate it for making the connection above mentioned.

In the drawing Figure 1 is an elevation of a portion of the spud or equivalent tubular member, the tail piece or tubular part to be attached thereto, and showing the application of the invention. Fig. 2 is an end elevation of the spud or tubular member. Fig. 3 is a plan of the clamp detached. Fig. 4 is a longitudinal section of a portion of the spud or tubular member and the tail piece or tubular part, and Fig. 5 is an elevation of the wedge or taper key employed in conjunction with the clamp for securing the parts.

The spud or equivalent tubular member 1 is constructed at its outer extremity with a partial annular flange or projection 2. In the flange 2 are provided two diametrically opposite slots 3. In the end of the member 1 and round the bore thereof is formed the annular recess 4—see Fig. 4—in which is placed suitable packing 5 for making the joint between the tail piece or tubular part 6 and member 1. The tail piece or part 6 carrying the hosepipe 6ª, is at its extremity constructed with a flange 7 of a size adapted to fit the recess 4 in the member 1.

For detachably connecting the part 6 to member 1 I provide a clamp or piece 8—see Figs. 1 and 3—which is constructed with a hole 9 at the center, through which the part 6 projects when the clamp is in position. This clamp or piece 8 is constructed with two diametrically opposite projections 10 forming preferably curved surfaces which engage the outside of the flange 7 of the part 6 at two diametrically opposite points—see Fig. 1.

The clamp 8 is also constructed with the two arms or branches 11, 12, the length of the arm 12 exceeding the length of the arm 11. Each of the arms is constructed with an inwardly directed projection 13. The projection 13 on the shorter arm 11 fits over and engages the flange 2 on the member 1 while the other projection 13 on the arm 12 projects over the flange 2 but some distance above it, so forming a space 14 between said flange 2 and said projection 13. In the space 14 is arranged a wedge or taper piece 15—see Fig. 5—by the driving of which in one direction the clamp 8 is drawn in the direction to force the flange 7 of the part 6 tightly into its seat in the packing recess 4 in the end of member 1. The projections 13 on the clamp 8 are of such a length that they will readily pass through the diametrically opposite slots 3 in the flange 2 of the member 1 when assembling the parts. After the projections 13 have passed through the slots 3 the clamp 8 is turned quarter of a revolution (more or less) to place it in such a position that the projection 13 on the short arm 11 engages the flange 2, and the projection 13 on the longer arm 12 lies over the flange 2 at the opposite side to form the space 14 for the tightening wedge 15.

What I claim as my invention and desire to protect by Letters Patent is:—

1. In a pipe coupling, the combination with a tubular member having a flange in which are formed diametrically opposite slots and a tail piece formed with a flange, of a clamp having arms, the one longer than the other, each of said arms having a projection, the one engaging the flange of the tubular member and the other projecting over and beyond it, and a wedge arranged between the flange of the tubular member and the projection of the longer arm, the clamp also engaging the flange of the tail piece, as set forth.

2. In a pipe coupling, the combination with a tubular member having a flange in which are formed diametrically opposite slots, said member also having a recess formed in the end and round the bore thereof, packing in said recess, and a tail piece having a flange fitting the recess in the tubular member, of a clamp having arms, the one longer than the other, each of said arms having a projection, the one engaging the flange of the tubular member and the other projecting over and beyond it, the clamp also having curved diametrically opposite projections adapted to engage the flange of the tail piece, and a wedge arranged between the flange of the tubular member and the projection of the longer arm, as and for the purpose set forth.

In witness whereof I have hereunto set my hand in the presence of two subscribing witnesses.

CHARLES ALFRED JEFFREYS.

Witnesses:
 CHAS. OVENDALE,
 R. OVENDALE.